J. W. HAYS.
MOTOR FOR BICYCLES AND VARIOUS KINDS OF VEHICLES.
APPLICATION FILED APR. 15, 1911.
1,019,637.
Patented Mar. 5, 1912.
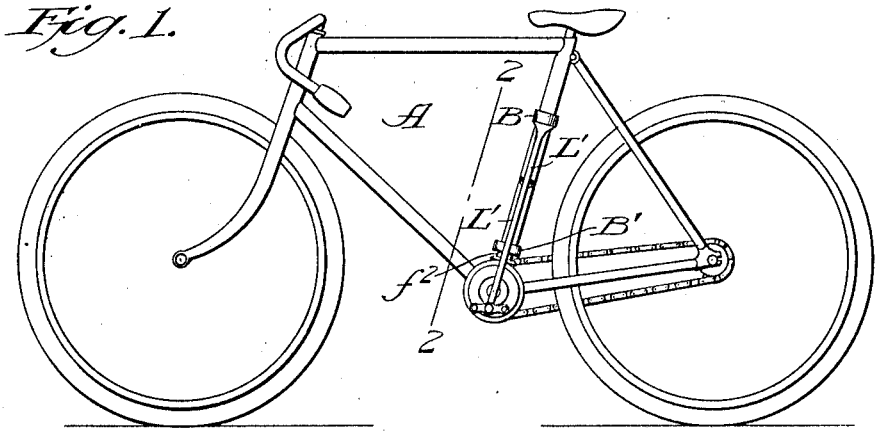
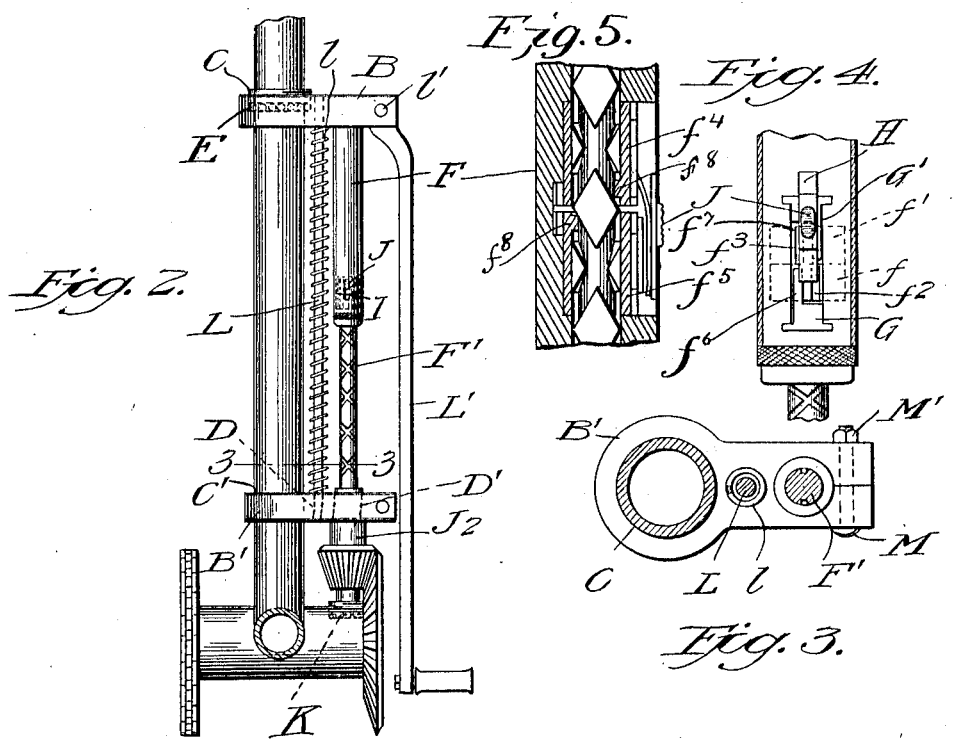
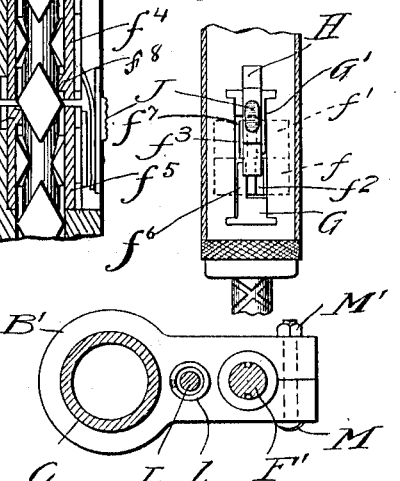
Witnesses
Inventor
James W. Hays
By Wm. H. Bates
Attorney

UNITED STATES PATENT OFFICE.

JAMES W. HAYS, OF BALTIMORE, MARYLAND.

MOTOR FOR BICYCLES AND VARIOUS KINDS OF VEHICLES.

1,019,637.　　　　　Specification of Letters Patent.　　Patented Mar. 5, 1912.

Application filed April 15, 1911. Serial No. 621,243.

*To all whom it may concern:*

Be it known that I, JAMES W. HAYS, citizen of the United States, residing at Baltimore city, State of Maryland, have invented certain new and useful Improvements in Motors for Bicycles and Various Kinds of Vehicles, of which the following is a specification.

My invention has relation to improvements in motors for bicycles and vehicles of various kinds for which such motors may be adapted, and the object primarily is to dispense with the usual treadles employed at the present time for the propulsion of said vehicles.

With this and other objects in view the invention consists in the novel construction and combination of parts as will be hereinafter more in detail described and the asserted novelty herein claimed.

I have fully and clearly illustrated my invention in the accompanying drawings in which;

Figure 1 is a side elevation of my invention equipped for use. Fig. 2 is a rear view thereof, and Figs. 3, 4 and 5 are detailed views showing more clearly the interior mechanism and double spiral portion for operating the device.

Similar letters of reference denote similar parts in the several figures.

Referring to the drawings: A designates a bicycle of the ordinary construction to which my invention is applied, and being of such ordinary construction a description herein of the same is deemed unnecessary.

B and B′ designate upper and lower horizontal twin yokes or short supports for the operating mechanism of my device, the yokes or supports B and B′ being provided with openings C and C′ in one end of each of the same. The upper yoke B is slidably secured at one and its larger end to the frame of the bicycle, and the lower yoke B′ being rigidly secured to the same the openings C and C′ in the yokes alining with each other. These yokes B and B′ are further provided with smaller openings D and D′, the openings D′ being next in size to C and C′, and the openings D being still smaller, and located adjacent to each other for a purpose which will hereinafter appear.

E designates a ball-bearing arranged in the yoke B and bearing against the tubular section of the frame, said bearing serving the purpose of diminishing the friction of the slidable yoke B in its vertical and reciprocating movement upon the tubular section of the frame when power is applied to the slidable yoke.

F, designates a tube secured to and depending from yoke B. The tube is internally cut away to receive two sleeves $f^4$ $f^5$ which surround and are freely revoluble upon a rod F′ journaled at its lower end on a part of the vehicle frame, and having oppositely directed spiral grooves extending along its exterior. Lugs $f^8$ on the interior of the sleeves travel in these grooves as the tube reciprocates. Ratchet teeth or toothed wheels $f$ $f'$ are provided on the exterior of the sleeves to coöperate with pawls or fingers $f^6$ $f^7$ on plates G, G′, losely fitting within a cut-out portion of the tube. The pawls or fingers are brought into engagement with the ratchet teeth of their respective sleeves by means of a spring slide H, controlled by a finger piece J, movable in a slot I, in the tube. When the finger piece is moved to the upper end of the slot the spring slide causes the finger $f^7$ to engage the ratchet teeth $f'$, on sleeve $f^4$ and the sleeve is held from turning about the rod F′. Hence as the tube is pressed downward the lug on sleeve $f^4$ will cause the rod F′ to turn, the pawl $f^6$ in the meantime, riding loosely over the teeth of and permitting the sleeve $f^5$ to turn. To revolve the rod F′ in the opposite direction the finger piece J, is moved to the lower end of the slot, releasing sleeve $f^4$, and locking $f^5$ against rotation. During the upward movement of the tube the rod does not turn, the two sleeves revolving in opposite direction as their respective lugs follow the oppositely pitched spiral grooves. The upward stroke of the tube is caused by a coil spring $l$, encircling a rod L extending between yokes B and B′. A foot piece pedal is secured to the end of the rod L′ depending from yoke B at $l'$. A beveled pinion on the lower end of rod F′ transmits the motion of the rod to the driving mechanism of the vehicle.

Having thus described my invention what I claim as new and desire to secure by Letters Patent is:—

1. In combination with the frame of a vehicle, an upper and lower yoke, the former slidable upon an upright portion of the frame, and the lower yoke fixed to such upright; a tube secured to and depending from the upper yoke, a rod having oppositely pitched external, spiral grooves, revolubly supported at its lower end on the vehicle frame and extending into the tube; sleeves within the tube, loosely encircling the rod, and having internal lugs traveling in the spiral grooves, means for holding either sleeve from rotating on the rod, means for reciprocating the upper yoke and the tube; and means for transmitting motion from the rod to the driving wheel of the vehicle.

2. The combination with the frame of a vehicle, an upper and lower yoke, the former slidable upon an upright portion of the frame, and the lower yoke fixed to such upright, a tube secured to and depending from the upper yoke, a rod having oppositely pitched external spiral grooves revolubly supported at its lower end on the vehicle frame and extending into the tube, sleeves within the tube loosely encircling the rod and having internal lugs traveling in the spiral grooves, means for holding either sleeve from rotation on the rod, means for reciprocating the upper yoke, and the tube, and means for transmitting motion from the rod to the driving wheel of the vehicle; of toothed wheels located on the exterior of the sleeves, plates loosely fitting within a cut out portion of the tube, fingers engaging the ratchet teeth of said sleeves, a spring slide operated by a finger piece moving in a slot in the tube.

3. The combination with the frame of a vehicle an upper and lower yoke, the former slidable upon an upright portion of the frame, and the lower yoke fixed to such support, a tube secured to, and depending from the upper yoke, a rod having oppositely pitched external spiral grooves revolubly supported at its lower end on the vehicle frame and extending into the tube, sleeves within the tube loosely encircling the rod and having internal lugs traveling in the spiral grooves, means for holding either sleeve from rotation on the rod, means for reciprocating the upper yoke and the tube, and means for transmitting motion from the rod to the driving wheel of the vehicle, toothed wheels located on the exterior of the sleeves, plates loosely fitting within a cut-out portion of the tube, fingers engaging the ratchet teeth of said sleeves, a spring slide operated by a finger piece moving in a slot in the tube; of a rod having one end secured in one of the yokes, and its other end passing freely through a guide hole in the other yoke, a coiled spring surrounding said rod and bearing against the yokes.

In testimony whereof I affix my signature in presence of two witnesses.

JAMES W. HAYS.

Witnesses:
HENRY CLOPEIN,
GEORGE A. C. SCHAUB.

---

Copies of this patent may be obtained for five cents each, by addressing the "Commissioner of Patents, Washington, D. C."